Figure 20:
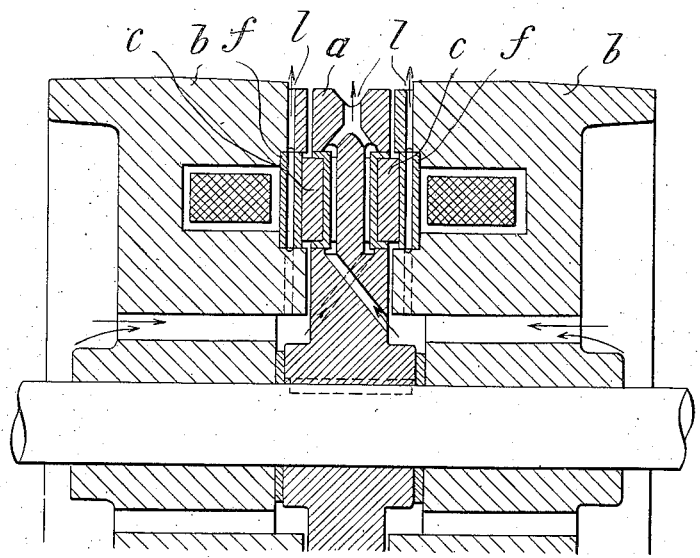

No. 880,266. PATENTED FEB. 25, 1908.
H. AST.
ELECTROMAGNETIC CLUTCH.
APPLICATION FILED JUNE 15, 1906.
6 SHEETS—SHEET 1.
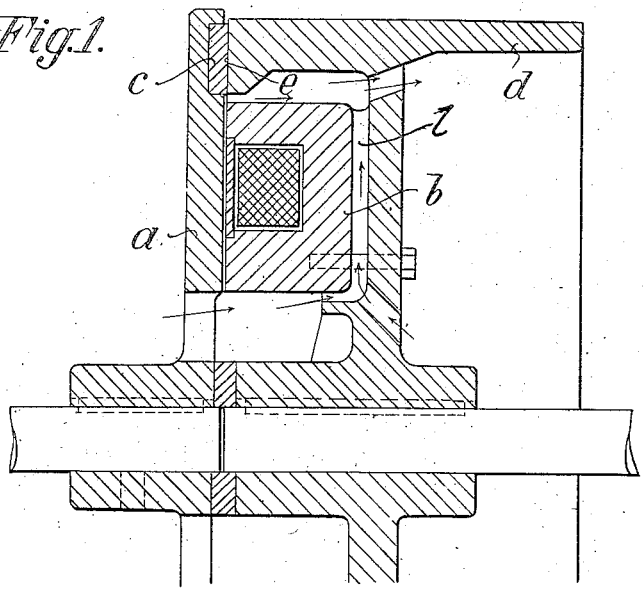
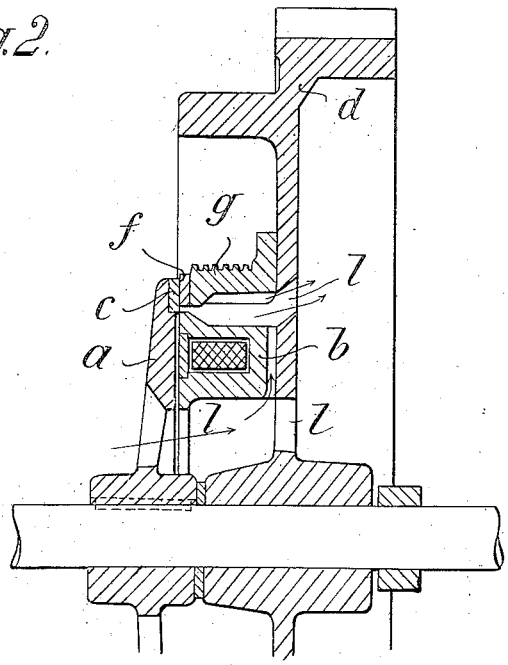

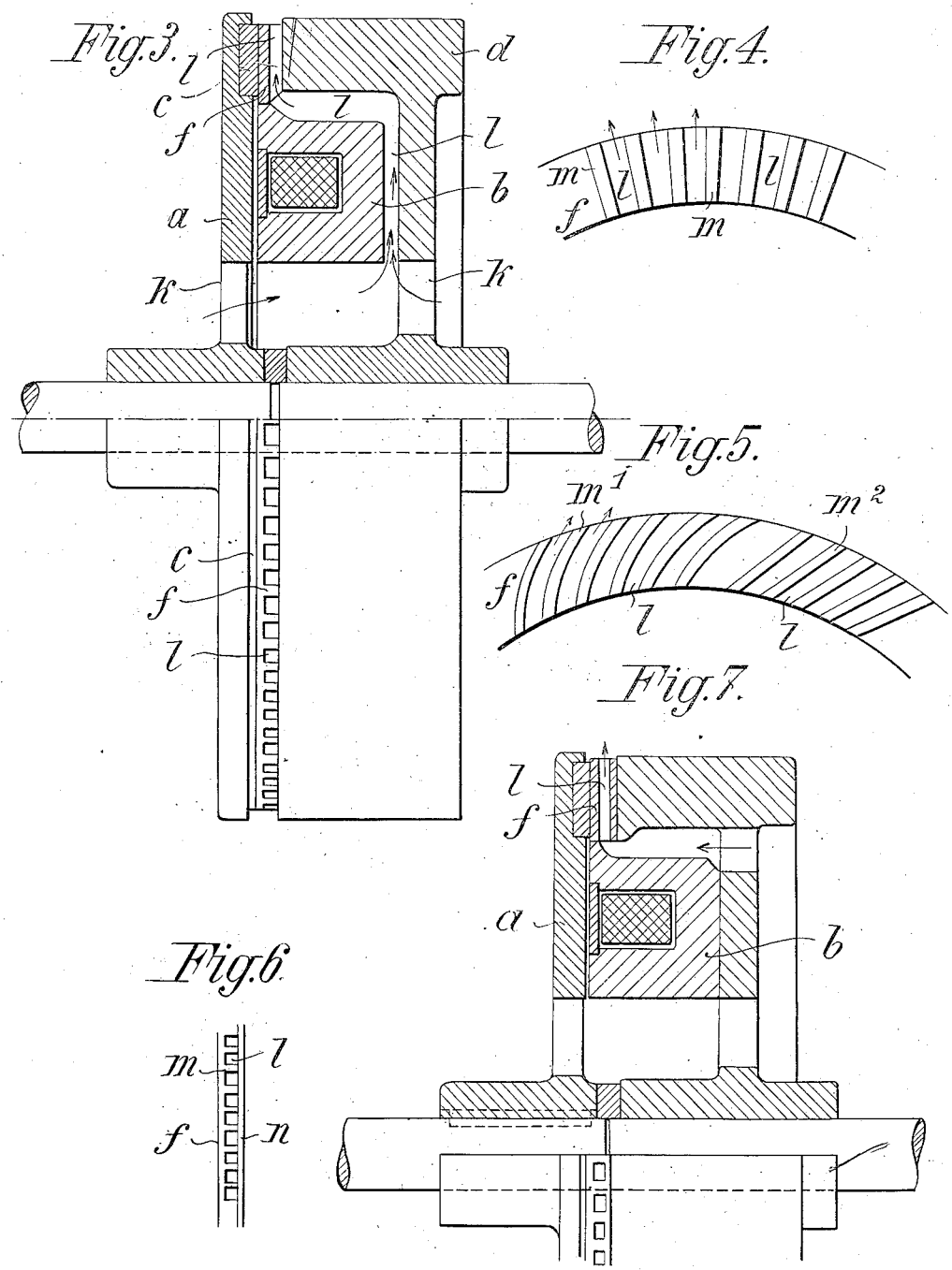

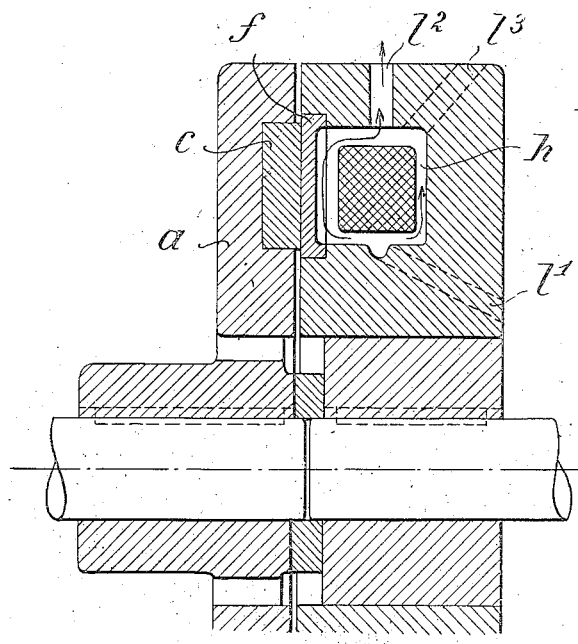
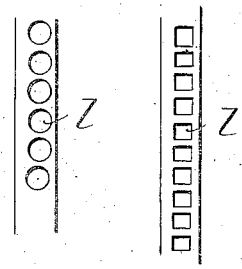
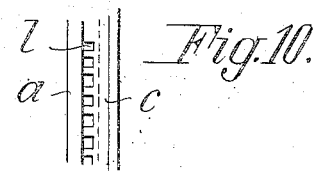
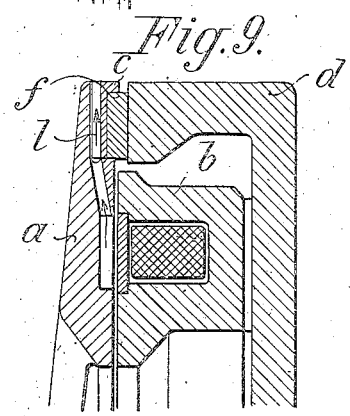
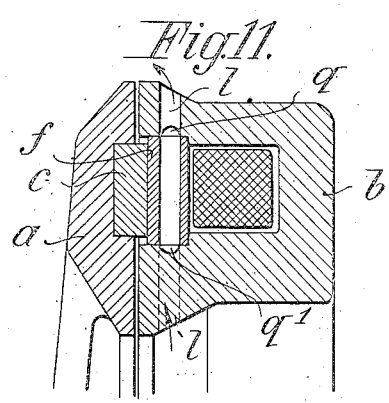

No. 880,266. PATENTED FEB. 25, 1908.
H. AST.
ELECTROMAGNETIC CLUTCH.
APPLICATION FILED JUNE 15, 1906.
6 SHEETS—SHEET 4.
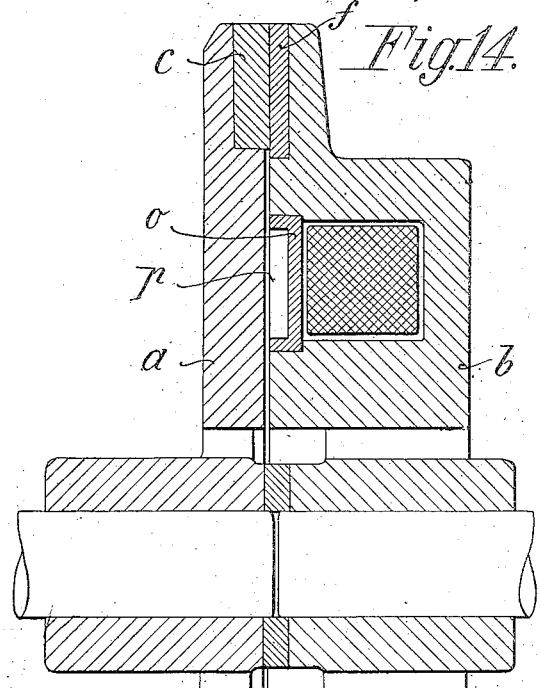
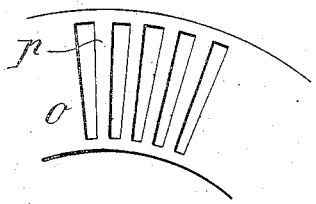
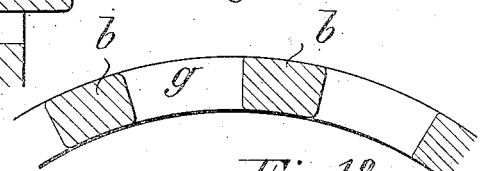
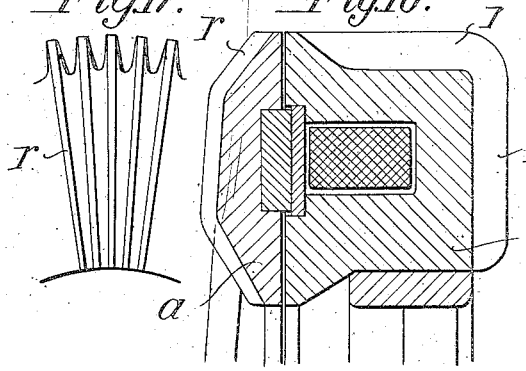
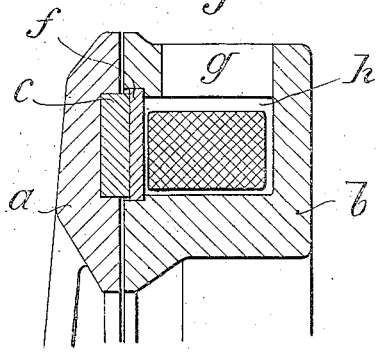
Witnesses
Sally O. Yudizky
Geo Eisenman
Heinrich Ast Inventor
By his Attorney
Fred'k P. Schustz No. 880,266. PATENTED FEB. 25, 1908.
H. AST.
ELECTROMAGNETIC CLUTCH.
APPLICATION FILED JUNE 15, 1906.

6 SHEETS—SHEET 5.

No. 880,266. PATENTED FEB. 25, 1908.
H. AST.
ELECTROMAGNETIC CLUTCH.
APPLICATION FILED JUNE 15, 1906.

6 SHEETS—SHEET 6.

Witnesses
Heinrich Ast, Inventor.
By his Attorney

UNITED STATES PATENT OFFICE.

HEINRICH AST, OF VIENNA, AUSTRIA-HUNGARY, ASSIGNOR TO THE FIRM OF VULKAN MASCHINENFABRIKS ACTIEN GESELLSCHAFT, OF VIENNA, AUSTRIA-HUNGARY.

ELECTROMAGNETIC CLUTCH.

No. 880,266.     Specification of Letters Patent.     Patented Feb. 25, 1908.

Application filed June 15, 1906. Serial No. 321,367.

*To all whom it may concern:*

Be it known that I, HEINRICH AST, a subject of the Emperor of Austria-Hungary, residing at Vienna, Austria-Hungary, have invented certain new and useful Improvements in Electromagnetic Clutches, of which the following is a specification.

In electro-magnetic clutches employed for driving purposes and that are put in and out of gear frequently and while under load, or in clutches that have often to start very slowly, the friction bodies and the magnetized parts of the clutch necessary for the production of the attractive force, often prove insufficient for taking up and carrying off the heat. In this connection, besides the heat due to the electric current, naturally generated in the winding, there has particularly to be considered the frictional heat generated in starting and reversing, which arises owing to the fact that the one clutch part, which is not intended to drive the other clutch part immediately, has first to slip through a short distance with the object of braking the live forces and accelerating up the masses so that the taking along of the other or driven part of the clutch may be effected without shock. Moreover frictional heat is also generated, especially in reversing gears and differential speed gears by reason of the fact that in putting into gear the clutch for one motion, the clutch for another motion cannot be put out of gear immediately without special devices owing to the greater or less amount of supervening residual magnetism, and therefore such clutch continues to slip for a further short distance. In some cases the heat produced by hysteresis and by eddy currents may also have to be taken into account.

Now this invention relates to improved constructions of electro-magnetic clutches whereby the heat that is developed can be carried off. For this purpose the improved construction embodies, either severally or in combination with one another, the following features: 1. Cooling the friction member, the magnet member, or the winding chamber, by the arrangement of suitable passages in these parts of the clutch. 2. Ventilation of the heat-producing component parts of the clutch by an arrangement of ribs or by ventilation passages, or by a ventilator-like formation of these parts of the clutch. 3. Carrying-off of the heat by enlargement of the radiating surface, or by connecting the heat-generating parts with component parts adapted to facilitate the transmission of heat.

The drawings illustrate by way of example various constructional forms of electromagnetic clutches embodying such features and at same time they indicate the diversity with which the combination of these features may be applied to suit particular cases that may present themselves at any time.

In the constructional form shown in Fig. 1 $a$ is the clutch part keyed on a shaft and which holds the friction member $c$; and $b$ is the magnet member forming the other part of the clutch and which is either running loose on the same shaft or may be mounted on the other shaft that is either driving or that has to be driven. This member is secured to a carrier $d$ on which the friction surface $e$ corresponding to the friction member $c$ is arranged. The frictional heat generated is absorbed by the carrier $d$, which is constructed as a belt pulley or a clutch disk, or a spur wheel or the like, and is readily given off to the surrounding medium by the relatively large surface of such carrier. Between the magnet member $b$ and the carrier $d$ are arranged air passages $l$ whereby an advantageous cooling of both parts is obtained.

Fig. 2 shows a constructional form of an electro-magnetic clutch in which the clutch part $b$ is made in one piece with the carrier $d$ which in this case consists of a spur wheel and which runs loose on the shaft. A separate body $g$ of large mass and presenting considerable surface area and which may also be provided with a separate friction member $f$, serves for absorbing and carrying off the frictional heat. Air passages $l$ effect an enhanced cooling action.

Fig. 3 shows, partly in elevation and partly in section, a constructional form in which air passages $l$ are led around the magnet member and behind the friction member $f$. For the purpose of increasing the heat-giving off surface or it may be for producing a moderate air draft the friction member may be provided with radial ribs $m$, as shown in Fig. 4, or be formed with ribs $m^1$ or $m^2$ respectively, which, as shown in Fig. 5, are curved or tangentially arranged according to the direction of rotation, or which may also be straight in form, and are arranged in the fashion of a ventilator in order to assist in increasing the air draft.

Fig. 6 shows a friction body $f$ formed with ribs $m$ provided with a juxtaposed ring $n$ made of good heat conducting material, e. g., copper, through which it bears against the carrier $d$ of the friction member.

As shown in Fig. 3, the arms or webs $k$ of the clutch parts may be provided with inclined lateral surfaces with the object of obtaining a ventilator-like action.

The constructional form shown in Fig. 7 comprises a friction member $f$ provided with separate air passages $l$; the walls between the passages may in this case also be arranged to extend radially or be curved or inclined in a manner suitable to a certain direction of rotation.

Fig. 8 shows a constructional form in which the winding chamber $h$ communicates with air passages $l^1$ and $l^2$. With the object of obtaining a favorable draft the passages $l^1$ are directed as much as possible towards the axis of the coupling; the passages $l^2$ are arranged radially or, with advantage, obliquely, so as to facilitate the exit of the air. Instead of these passages $l^2$ passages $l^3$ extending obliquely in an outward direction may be provided. The friction member $f$, which in this construction is arranged between the attracting surfaces has ribs on its inner side that serve both for increasing the heat-giving-off surface and for obtaining a cooling effect.

Figs. 9 and 10 show in section and in elevation respectively a form of construction in which the friction member $c$ of the part $a$ of the clutch is provided with cooling passages $l$.

Figs. 11, 12 and 13 illustrate ventilating arrangements for a friction member $f$ arranged between the attracting surfaces and in the part $b$ of the clutch. This friction member is provided with air passages $l$ which may be round or angular in form and are radially arranged or curved. These passages open into collecting channels $q$ and $q^1$, from which start separate passages $l$ that traverse the magnet member $b$.

As shown in Figs. 14 and 15, ribs $p$ may be provided on the covering ring $o$ of the winding chamber with the object of obtaining a better cooling action.

According to Figs. 16 and 17 ribs $r$ are arranged on the outer surfaces of the clutch parts $a$ and $b$ in order to increase the heat-transmitting surface. The winding space $h$ may also, as shown in Figs. 18 and 19, be ventilated by large openings $g$ instead of by passages such as shown in Fig. 8.

Fig. 20 shows another form of ventilating arrangement suitable for an electro-magnetic clutch with double fixed part $a$ and two magnet members $b$. In this case both the friction members $c$ of the double fixed part and the two magnet members are provided with air passages $l$, arranged in contiguity to the friction members, or in some cases it may be in the friction members.

Figures 21, 23:
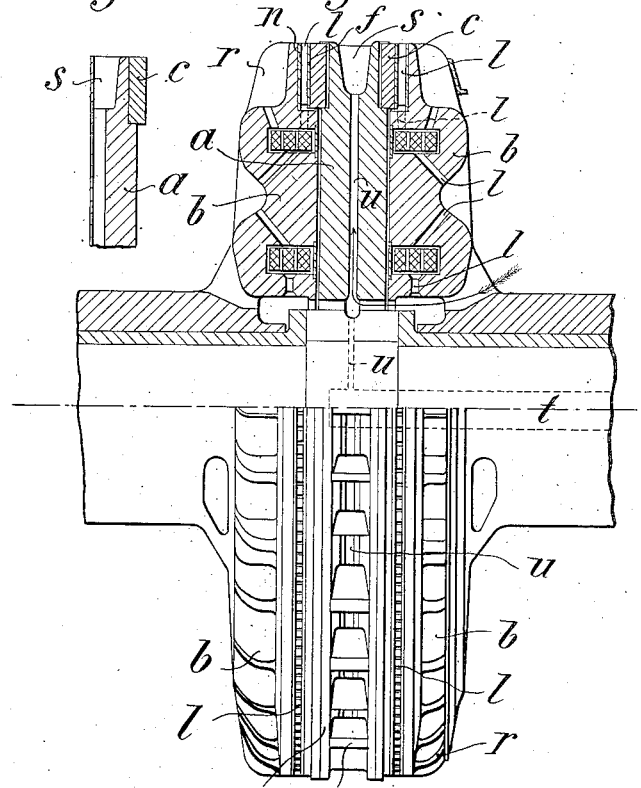
Figure 22:
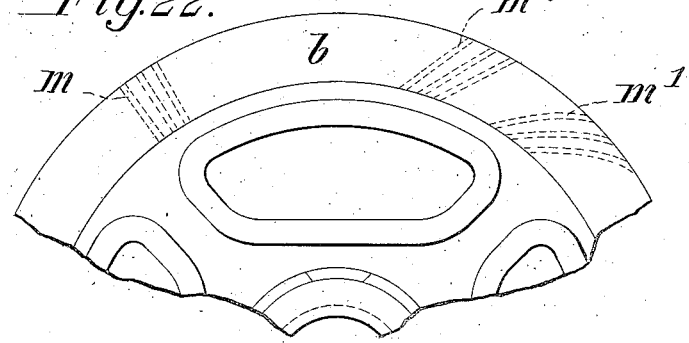

Fig. 21 shows the arrangement of an electro-magnetic double clutch in which the winding is not arranged in an annular groove, concentrical to the axis, but in which two or more windings, each closed in itself, (Fig. 22) are embedded in the magnet member outside of the axis. The ventilation of the double armature $a$ is effected by means of ribs or blades $s$ provided in suitable shape and numbers between the disks of the armature in the shape of a ventilator. The cooling of the winding and of the friction rings is effected in a similar manner, as shown in Figs. 11 or 6. The cooling of the magnet members is effected in a similar manner as in the arrangement shown in Fig. 16, by means of ribs $r$ and these latter may be arranged so as to assume the shape of a ventilator as indicated in Fig. 21. In single clutches of this description the armature disk will be arranged so as to form a ventilator in the manner represented in Fig. 23.

In order to efficiently remove the heat generated by eddy currents the cooling of the armature and of the magnet member may also be effected by compressed air or by some other air-like or liquid medium admitted from the exterior through a hollow space $t u$ of the clutch shaft (Fig. 21) or in some other suitable manner.

Claims.

1. In electro-magnetic clutches: a clutch part provided with a friction member; a carrier provided with a friction surface adapted to engage said friction member; and a magnet member secured to said carrier.

2. In electro-magnetic clutches: a clutch part provided with a friction member; a carrier of relatively large surface provided with a friction surface or member adapted to engage with the said friction member; and a magnet member secured to and surrounded by said carrier.

3. In electro-magnetic clutches: a clutch part provided with a friction member; a carrier provided with a friction surface adapted to engage said friction member; a magnet member secured to said carrier; and means to promote ventilation and assist in the dissipation of the heat generated between said friction member and said friction surface.

4. In electro-magnetic clutches: a clutch part; a carrier; a magnet member secured to said carrier; and air passages or channels between said carrier and said magnet member.

5. In electro-magnetic clutches: a clutch part; a carrier provided with air passages or channels; and a magnet member secured to said carrier.

6. In electro-magnetic clutches: a clutch part provided with air passages or channels; a carrier; a magnet member secured to said carrier; and air passages or channels between said carrier and said magnet member.

7. In electro-magnetic clutches: a clutch part; a carrier provided with air passages or channels; a magnet member secured to and surrounded by said carrier; and air spaces or channels surrounding said magnet member and communicating with the air passages in the said carrier.

8. In electro-magnetic clutches: a carrier; a friction surface or member; ventilating air passages or channels in connection with said friction member; and ventilating air passages or channels in said carrier, and communicating with the said ventilating air passages or channels in connection with said friction member.

9. In electro-magnetic clutches: a carrier; a friction surface or member secured to said carrier; and ventilating air passages or channels between said friction member and said carrier.

10. In electro-magnetic clutches: a carrier of relatively large surface and provided with a friction surface or member; and ventilating air passages or channels in said carrier.

11. In electro-magnetic clutches: a carrier; a magnet member and a friction member carried thereby; ventilating air passages or channels in said carrier; and ventilating air passages or channels through said friction member and communicating with said ventilating passages or channels in said carrier.

12. In electro-magnetic clutches: a carrier; a magnet member and a friction member carried thereby; ventilating air passages or channels in said carrier; ventilating air passages or channels between said carrier and said magnet member; and ventilating air passages or channels through said friction member and communicating with said ventilating air passages or channels in said carrier.

In testimony whereof I have hereunto set my hand in presence of two subscribing witnesses.

HEINRICH AST.

Witnesses:
JOSEF RUBARCH,
ALVESTO S. HOGUE.